United States Patent
Miyamoto et al.

(10) Patent No.: US 6,613,135 B1
(45) Date of Patent: *Sep. 2, 2003

(54) PSEUDO-PLASTIC WATER BASED INK FOR BALLPOINT PEN

(75) Inventors: Masaru Miyamoto, Yokohama (JP); Shigeru Miyazaki, Yokohama (JP); Yoji Takeuchi, Yokohama (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/786,178

(22) PCT Filed: Sep. 1, 1999

(86) PCT No.: PCT/JP99/04740

§ 371 (c)(1),
(2), (4) Date: Jun. 11, 2001

(87) PCT Pub. No.: WO00/12638

PCT Pub. Date: Mar. 9, 2000

(30) Foreign Application Priority Data

Sep. 1, 1998 (JP) .......................................... 10-246763

(51) Int. Cl.[7] .............................................. C09D 11/00
(52) U.S. Cl. ................................. 106/31.35; 106/31.67
(58) Field of Search ............................ 106/31.35, 31.67

(56) References Cited

FOREIGN PATENT DOCUMENTS

| EP | 0999244 A | 5/2000 | ........... C09D/11/18 |
|----|-----------|--------|----------------------|
| JP | 02038474  | 2/1990 | ........... C09D/11/18 |
| JP | 38474/1990 | 2/1990 | |
| JP | 03028279  | 2/1991 | ........... C09D/11/18 |
| JP | 09-302299 | 11/1997 | ........... C09D/11/18 |
| JP | 10-310734 | 11/1998 | ........... C09D/11/18 |

OTHER PUBLICATIONS

English Translation of JP 02–038474, Jul. 1990.*
European Search Report for EP9994060.9 dated Oct. 22, 2002.

* cited by examiner

Primary Examiner—Mark L. Bell
Assistant Examiner—Veronica F. Faison
(74) Attorney, Agent, or Firm—Darby & Darby

(57) ABSTRACT

A pseudo-plastic water based ink for a ballpoint pen comprising a colorant, water and 1 to 40% by weight of a polyglycerin fatty acid ester represented by the following Formula (I) and containing no water-soluble organic solvent:

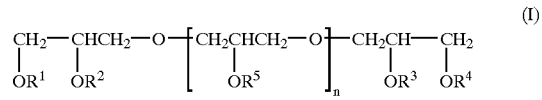

wherein $R^1$ to $R^4$ each represent independently an aliphatic acyl group having 12 to 20 carbon atoms or a hydrogen atom; $R^5$'s, which may be the same or different, represent an aliphatic acyl group having 12 to 20 carbon atoms or a hydrogen atom; n represents an integer of 1 to 30; and the total number of the aliphatic acyl groups is 1 to 5.

It is a pseudo-plastic water based ink for a ballpoint pen which has good aging stability and provides good writing feeling and which is excellent in cap-off resistance.

2 Claims, No Drawings

PSEUDO-PLASTIC WATER BASED INK FOR BALLPOINT PEN

This application is a national phase application under 35 U.S.C. §371 of International Application No. PCT/JP99/04740, filed Sep. 1, 1999, which was published in Japanese as International Publication No. WO 00/12638 on Mar. 9, 2000 and claims the benefit of Japanese Patent Application No. 10/246763, filed Sep. 1, 1998.

TECHNICAL FIELD

The present invention relates to a water based ink for a ballpoint pen, more specifically to a shear thinning water based ink for a ballpoint pen having advantages of a ballpoint pen using an oil based ink, that is, a pseudo-plastic water based ink for a ballpoint pen.

BACKGROUND ART

In general, inks for a ballpoint pen have so far been classified into a water based ink for a ballpoint pen which contains a solvent comprising a water based solvent such as water and has a low viscosity of 10 mPa·s or less and an oil based ink which contains a solvent comprising an oil based solvent such as mineral oil, polyhydric alcohol, a fatty acid and cellosolve and has an ink viscosity of 1000 to 20000 mPa·s.

A ballpoint pen using an oil based ink for a ballpoint pen has such structure that the ink stuck on a ball through an ink reservoir having a small diameter is transferred onto a paper surface by rotation of the ball and only the transferred portion of the ink is fed again from the reservoir to the ball.

On the other hand, a ballpoint pen using a water based ink for a ballpoint pen has such structure that the ink is fed to a ball surface and a paper surface by virtue of capillary action of a feed prepared by binding fine fibers.

While the water based ink for a ballpoint pen and the oil based ink for a ballpoint pen described above each have excellent advantages, they have various problems as well.

For example, in the water based ink for a ballpoint pen, capillary action is used in a principle for feeding the ink because of a low viscosity thereof, wherein a simple contact of the tip portion of the ballpoint pen with paper allows the capillary action to be exerted on the contact point thereof to feed the ink, and good lines can be written on a paper surface without applying so much writing pressure, so that splitting, starving and blobbing are not likely to take place. On the other hand, storing the ink directly in the ink reservoir allows the ink to leak due to vibration, impact and a rise in an external temperature to make the amount of the ink to be fed to the ball instable, and therefore the ballpoint pen requires a complicated structure having a feed prepared by binding fine fibers and has the problem that it is difficult to observe the amount of the ink.

On the other hand, an oil based ink for a ballpoint pen is characterized in that because of a high viscosity thereof, blobbing of the ink from the pen tip can be prevented and the ink can be stored directly in the ink reservoir having a small diameter, so that the structure of the ballpoint pen can be simplified and that the amount of the ink can be observed by using a transparent material for the ink reservoir. On the other hand, there are involved the problems that since the ink is transferred only on a paper surface come into contact with the rotating ball, splitting and starving are liable to be caused if the ball rotates unstably and that since the ink hardly penetrates into a paper surface, blobbing which causes stain with the untransferred ink is apt to be caused.

In recent years, in order to solve such problems, produced are water based inks for a ballpoint pen (hereinafter referred to as "a pseudo-plastic water based ink for a ballpoint pen") in which a gelatinizer and a water soluble paste are added to a water-soluble ink to impart a specific viscosity characteristic to the ink.

A ballpoint pen using this pseudo-plastic water based ink for a ballpoint pen is reduced in an ink viscosity by shear force which is applied to the ink by rotation of the ball at the tip point when writing and can write as smoothly as a ballpoint pen using a water based ink to make good lines on a paper surface. Further, when the pen is not used for writing, blobbing of the ink from the pen tip can be prevented because the ink has a high viscosity. The ink can be stored directly in the ink reservoir, so that the structure thereof can be simplified, and the use of a transparent material for the ink reservoir makes it possible to observe the amount of the ink. Thus, the use of the pseudo-plastic water based ink for a ballpoint pen provides a-writing instrument having both characteristics of a ballpoint pen using a water based ink and a ballpoint pen using an oil based ink.

When producing such a pseudo-plastic water based ink for a ballpoint pen, a viscosity-controlling agent (thickener) has so far had to be blended as an essential component for an ink material. The viscosity-controlling agent is added in order to impart a pseudo-plasticity to the ink, and it is proposed to add, for example, polyacrylic acid salts, cross-linking type acrylic acid polymers, salts of a styrene-acrylic acid copolymer, salts of a styrene-maleic acid copolymer, nonionic polymers such as polyvinylpyrrolidone and polyethylene glycol, and polysaccharides such as xanthan gum, guar gum, casein, gum arabic, gelatin, carrageenan, alginic acid, tragacanth gum and locust bean gum.

However, these viscosity-controlling agents have caused the problems that they bring about scattering in the capability for providing a shear thinning property depending on a lot to exert influence on the writing property and they are inferior in compatibility with some colorants to cause a change in a viscosity of the ink in heating and aging and reduce the performances of the ballpoint pen and that they restrict the compounding of various materials such as a surfactant, an organic solvent, a dispersing resin for a pigment and the like which are compounded in addition to these viscosity-controlling agents into some kinds of the inks.

On the other hand, proposed in Japanese Patent Laid-Open No. Hei 9-302299 is a shear thinning ink for a ballpoint pen which comprises a colorant, a water-soluble organic solvent and a nonionic surfactant having an HLB value of 8 to 12 as an agent for providing a shear thinning property and which has a viscosity of 25 to 160 mpa s determined at a revolution of 100 rpm by an EM type rotational viscometer and a shear thinning index of 0.1 to 0.6.

However, all nonionic surfactants having an HLB alue of 8 to 12 do not always impart the shear thinning property, and while-exhibiting the shear thinning property in an aqueous solution, a thickening property is lost in many cases by blending a water-soluble organic solvent. Further, if a blending amount of the above surfactant is increased in order to impart the shear thinning property and a water-soluble organic solvent is blended into the system, feathering of the drawn lines is heavy to make the lines very indistinct.

Further, proposed in U.S. Pat. No. 2,662,882 is a pigment ink for a ballpoint pen which comprises a pigment, water, water-soluble saccharides and a polyglycerin fatty acid ester.

However, an ink using water-soluble saccharides as a main thickener is increased in a concentration of the water-soluble saccharides (thickener) by a portion of moisture evaporated from the pen tip with the passage of time, and a viscosity of the ink at the pen tip grows large, which brings about the problems that the inferior flowability is caused and the cap-off resistance is reduced.

The present invention has been made in light of the problems described above, and an object thereof is to provide a pseudo-plastic water based ink for a ballpoint pen which causes less scattering in a viscosity depending on a production lot and has satisfactory viscosity and pseudo-plasticity and which has good stability with the passage of time whatever colorants are used and provides good writing feeling and excellent cap-off resistance.

DISCLOSURE OF THE INVENTION

Intensive researches continued by the present inventors in order to solve the problems described above have resulted in finding that a pseudo-plastic water based ink for a ballpoint pen meeting the object described above can be obtained by adding a polyglycerin fatty acid ester represented by Formula (I) and blending no water-soluble organic solvent. Thus, the present invention has been completed.

That is, the pseudo-plastic water based ink for a ballpoint pen of the present invention is characterized by comprising a colorant, water and 1 to 40% by weight of a polyglycerin fatty acid ester represented by the following Formula (I) and containing no water-soluble organic solvent:

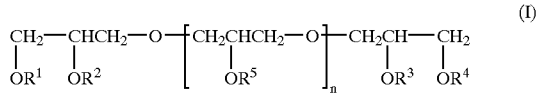

(I)

wherein $R^1$ to $R^4$ each represent independently an aliphatic acyl group having 12 to 20 carbon atoms or a hydrogen atom; $R^5$'s, which may be the same or different, represent an aliphatic acyl group having 12 to 20 carbon atoms or a hydrogen atom; n represents an integer of 1 to 30; and the total number of the aliphatic acyl groups is 1 to 5.

Further, the pseudo-plastic water based ink for a ballpoint pen has a viscosity of 100 to 4000 mPa·s at a shearing speed of 3.84 s5

Best Mode for Carrying Out the Invention

The embodiment of the present invention shall be explained below in detail.

The polyglycerin fatty acid ester added to the pseudo-plastic water based ink for a ballpoint pen of the present invention is represented by Formula (I) described above.

In Formula (I) described above, $R^1$ to $R^4$ each represent independently an aliphatic acyl group having 12 to 20 carbon atoms or a hydrogen atom; $R^5$'s, which may be the same or different, represent an aliphatic acyl group having 12 to 20 carbon atoms or a hydrogen atom; and n represents an integer of 1 to 30. The total number of the aliphatic acyl groups is 1 to 5, preferably 1 to 3.

In Formula (I), the aliphatic acyl group having 12 to 20 carbon atoms represented by $R^1$ to $R^5$ includes, for example, isostearoyl, oleoyl, stearoyl, palmitoyl and lauroyl.

Specific examples of the polyglycerin fatty acid ester represented by Formula (I) includes, for example, hexaglycerin isostearate, hexaglycerin stearate, hexaglycerin oleate, hexaglycerin palmitate, hexaglycerin laurate, hexaglycerin linoleate, hexaglycerin linolenate, hexaglycerin myristate, octaglycerin oleate, octaglycerin palmitate, octaglycerin laurate, octaglycerin linoleate, octaglycerin linolenate, octaglycerin myristate, decaglycerin oleate, decaglycerin palmitate, decaglycerin laurate, decaglycerin linoleate, decaglycerin linolenate and decaglycerin myristate. They may be used alone or in suitable combination of two or more kinds thereof.

The polyglycerin fatty acid ester used in the present invention provides a good lubricating property, imparts a shear thinning property and has a vaporization-controlling effect, and therefore it can be used as an alternate material for each of a polar solvent, a lubricant and a viscosity-controlling agent in conventional materials. In particular, when it is used as an alternative for a viscosity-controlling agent, it is prevented that the scattering in the capability for providing a shear thinning property depending on a lot of the materials influences the writing property and that a change in the viscosity in heating and aging is brought about because of inferior compatibility with a colorant to reduce a performance of the pen.

An addition amount of the polyglycerin fatty acid ester is suitably selected from a range of 1 to 40% by weight, preferably 3 to 20% by weight based on the total amount of the pseudo-plastic water based ink for a ballpoint pen.

The addition amount of less than 1% by weight does not provide a satisfactory thickening effect and brings about inconvenience such as blobbing of the ink from the pen tip. On the other hand, the addition amount exceeding 40% by weight raises a viscosity of the ink and therefore is likely to bring about a reduction in the writing property due to inferior followability of the ink.

The pseudo-plastic water based ink for a ballpoint pen of the present invention is characterized by containing no organic solvent. If blended with the organic solvent, the satisfactory thickening effect is not obtained, and feathering of the drawn lines is heavy, so that the lines become very indistinct. Further, the pseudo-plastic water based ink for a ballpoint pen of the present invention is not blended with a water-soluble organic solvent such as ethylene glycol considering the environment.

Further, the polyglycerin fatty acid ester can be used, if necessary, in combination with other lubricants, viscosity-controlling agents and the like respectively.

All dyes and pigments which can be dissolved or dispersed in water based solvents can be used as the colorant. Specific examples thereof include acidic dyes such as Eosine, Phloxine, Water Yellow #6-C, acid red, Water Blue #105, Brilliant Blue FCF and Nigrosine NB, direct dyes such as Direct Black 154, Direct Sky Blue 5B and Violet BB, basic dyes such as Rhodamine and Methyl Violet, inorganic pigments such titanium dioxide, carbon black and ultramarine, organic pigments such as Copper Phthalocyanine Blue and Benzidine Yellow, and various metal powders. They each may be used alone or in suitable combination of two or more kinds thereof.

A use amount of the colorant is suitably selected from a range of 1 to 40% by weight, preferably 3 to 20% by weight based on the total amount of the pseudo-plastic water based ink for a ballpoint pen.

When a pigment is used as the colorant, a water-soluble polymer dispersant and a surfactant may suitably be selected and blended. Specific examples thereof include anionic polymers such as polyacrylic acid salts, salts of a styrene-acrylic acid copolymer, salts of a styrene-maleic acid copolymer, salts of a vinylnaphthalene-maleic acid copolymer and a β-naphthalenesulfonic acid-formalin condensation product, and nonionic polymers such as polyvinyl alcohol, polyvinylpyrrolidone and polyethylene glycol. A use amount thereof is suitably selected from a range in which the properties of the pseudo-plastic water based ink for a ballpoint of the present invention pen are not damaged.

Components other than those described above may be added, if necessary, to the pseudo-plastic water based ink for a ballpoint pen of the present invention in a range in which the properties thereof are not damaged. The components which can be added include a lubricant such as polyalkylene glycol derivatives, fatty acid alkali salts, nonionic surfactants and fluorine base surfactants, a rust preventive such as benzotriazole and saponins, a pH-controlling agent such as potassium hydroxide and potassium phosphate, a preservative such as sodium omadine and 1,2-benzoisothiazoline, and a viscosity-controlling agent such as polyacrylic acid salts and alginic acid.

A viscosity of the pseudo-plastic water based ink for a ballpoint pen of the present invention falls in a range of 100 to 4000 mPa·s, preferably 200 to 2000 mPa·s and more preferably 300 to 1000 mPa·s at a shearing speed of $3.84 \text{ s}^{-1}$.

If the viscosity of the ink is lower than 100 mPa·s, the ink is blobbed from the pen tip. Further, when a colorant having a large specific gravity such as titanium dioxide and metal powder is used, the viscosity has to be controlled rather high in order to prevent the colorant from settling, and the upper limit thereof is preferably 4000 mPa·s. If the viscosity of the ink exceeds 4000 mPa·s, a reduction in the writing property due to inferior followability of the ink is apt to be brought about.

The pseudo-plastic (shear thinning) water based ink for a ballpoint pen according to the present invention can easily be obtained by dissolving the components described above, if necessary, with heating and mixing them under stirring.

EXAMPLES

The present invention shall be explained below in further details with reference to examples and comparative examples, but the present invention shall by no means be restricted by the examples.

Example 1

The following components were blended to obtain a blue pseudo-plastic water based ink for a ballpoint pen:

| | |
|---|---|
| Phthalocyanine blue | 8.0% by weight |
| Styrene-maleic acid resin ammonium salt | 3.0% by weight |
| Hexaglycerin isostearate (1.5 esters) | 15.0% by weight |
| Phosphoric acid ester | 0.3% by weight |
| 1,2-Benzoisothiazolone salt (preservative) | 0.3% by weight |
| Aminomethylpropanol (pH-controlllng agent) | 0.3% by weight |
| Benzotriazole (rust preventive) | 0.2% by weight |
| Ion-exchanged water | balance |

Example 2

The following components were blended to obtain a

| | |
|---|---|
| Carbon black | 7.0% by weight |
| Styrene-acrylic acid resin ammonium salt | 3.0% by weight |
| Octaglycerin oleate (2 esters) | 5.0% by weight |
| 1,2-Benzoisothiazolone salt (preservative) | 0.3% by weight |
| Aminomethylpropanol (pH-controlling agent) | 0.3% by weight |
| Benzotriazole (rust preventive) | 0.2% by weight |
| Polyacrylic acid salt (acryl base synthetic polymer: viscosity-controlling agent) | 0.1% by weight |
| Ion-exchanged water | balance |

Example 3

The following components were blended to obtain a blue pseudo-plastic water based ink for a ballpoint pen:

| | |
|---|---|
| Phthalocyanine blue | 8.0% by weight |
| Styrene-acrylic acid resin ammonium salt | 2.7% by weight |
| Decaglycerin palmitate (2 esters) | 12.0% by weight |
| 1,2-Benzoisothiazolone salt (preservative) | 0.3% by weight |
| Aminomethylpropanol (pH controlling agent) | 0.3% by weight |
| Benzotriazole (rust preventive) | 0.2% by weight |
| Polyacrylic acid salt (acryl base synthetic polymer: viscosity-controlling agent) | 0.1% by weight |
| Ion-exchanged water | balance |

Comparative Example 1

A blue pseudo-plastic water based ink for a ballpoint pen was obtained in the same manner as in Example 1, except that 15% by weight of propylene glycol and 0.4% by weight of a cross-linking type acrylic acid polymer were added respectively in place of hexaglycerin isostearate (1.5 esters).

Comparative Example 2

A blue pseudo-plastic water based ink for a ballpoint pen was obtained in the same manner as in Example 1, except that 15% by weight of propylene glycol was further added.

Comparative Example 3

A black pseudo-plastic water based ink for a ballpoint pen was obtained in the same manner as in Example 2, except that 3.0% by weight of carboxymethyl cellulose.(water-soluble polysaccharides) was added in place of octaglycerin oleate (2 esters).

Comparative Example 4

A blue pseudo-plastic water based ink for a ballpoint pen was obtained in the same manner as in Example 3, except that 10% by weight of propylene glycol and 0.25% by weight of a polyacrylic acid salt were added respectively in place of decaglycerin palmitate (2 esters).

Comparative Example 5

A blue pseudo-plastic water based ink for a ballpoint pen was obtained in the same manner as in Example 3, except that 12% by weight of octanol ethylene oxide 3 mole adduct (H. L. B.: 8.7) was added in place of decaglycerin palmitate (2 esters).

Comparative Example 6

A blue pseudo-plastic water based ink for a ballpoint pen was obtained in the same manner as in Example 3, except that 20% by weight of propylene glycol and 0.80% by weight of a polyacrylic acid salt were added respectively in place of decaglycerin palmitate (2 esters).

Evaluation Tests

The pseudo-plastic water based inks for a ballpoint pen obtained in Examples 1 to 3 and Comparative Examples 1 to 6 were filled respectively into a ballpoint pen having a ball diameter of 0.7 mm, and the ballpoint pens thus obtained were used to carry out the evaluation tests of:

(1) an ink viscosity of the initial ink at a shearing speed of 3.84 s$^{-1}$,
(2) a change in the ink viscosity after stored at 50° C. for one month,
(3) time passed until starving is caused after left standing with the cap off,
(4) writing feeling of the pen,
(5) followability of the ink in the drawn lines obtained by writing with a hand,
(6) the presence of blobbing of the ink, and
(7) feathering in the drawn lines obtained by writing with a hand.

The results are shown in the following Table 1. The writing feeling (4), the ink followability (5) and the feathering (7) in the drawn lines were evaluated respectively based on the following criteria.

Evaluation criteria of writing feeling:
○: smooth and stable writing feeling
Δ: stiff and hard writing feeling
X: stiff and hard writing feeling with skipping and directivity Evaluation Criteria of Ink Followability:
○: capable of smoothly and stably writing
Δ: causing skipping in writing at a double speed
X: no follow-up of the ink to cause skipping in usual writing Evaluation Criteria of Feathering in the Drawn Lines
○: no feathering and distinct lines
Δ: feathering observed and indistinct lines
X: marked feathering observed and very indistinct lines Comments on Table 1

As apparent from the results shown in Table 1, the pseudo-plastic water based inks for a ballpoint pen prepared in Examples 1 to 3 falling in the scope of the present invention provided good results on all of an ink viscosity, a viscosity change, time passed until starving is caused, writing feeling, ink followability, ink blobbing and feathering in the drawn lines as compared with those of the pseudo-plastic water based ink for a ballpoint pen prepared in Comparative Examples 1 to 6 falling outside the scope of the present invention. This makes it clear that the pseudo-plastic water based ink for a ballpoint pen of the present invention are apparently excellent.

TABLE 1

|  | Example | | | Comparative Example | | | | | |
| --- | --- | --- | --- | --- | --- | --- | --- | --- | --- |
|  | 1 | 2 | 3 | 1 | 2 | 3 | 4 | 5 | 6 |
| (1) Ink viscosity (mPa · s) | 550 | 550 | 450 | 700 | 300 | 600 | 500 | 30 | 4500 |
| (2) Viscosity change | None | None | None | A little rise | None | Rise | Down | None | Rise |
| (3) Time until starving | 28 days | 21 days | 21 days | 28 days | 28 days | 14 days | 14 days | 60 days | One day |
| (4) Writing feeling | ○ | ○ | ○ | Δ | ○ | Δ | ○ | ○ | X |
| (5) Ink followability | ○ | ○ | ○ | ○ | ○ | Δ | ○ | ○ | X |
| (6) Ink blobbing | None | None | None | None | None | None | None | Present | None |
| (7) Feathering in drawn lines | ○ | ○ | ○ | ○ | X | ○ | ○ | X | ○ |

Industrial Applicability

According to the present invention, obtained is a pseudo-plastic water based ink for a ballpoint pen which has very good aging stability and is free of feathering and which has a vaporization-inhibiting effect and provides good writing feeling, and it can be applied to ballpoint pens having the same structure as that of a ballpoint pen using an oil based ink.

What is claimed is:

1. A pseudo-plastic water based ink for a ballpoint pen comprising a colorant, water and 1 to 40% by weight of a polyglycerin fatty acid ester represented by the following Formula (I) and containing no water-soluble organic solvent:

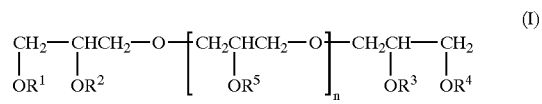

wherein $R^1$ to $R^4$ each represent independently an aliphatic acyl group having 12 to 20 carbon atoms or a hydrogen atom; $R^5$'s, which may be the same or different, represent an aliphatic acyl group having 12 to 20 carbon atoms or a hydrogen atom; n represents an integer of 1 to 30; and the total number of the aliphatic acyl groups is 1 to 5.

2. The pseudo-plastic water based ink for a ballpoint pen as described in claim 1, wherein the ink has a viscosity of 100 to 4000 mPa·s at a shearing speed of 3.84 s$^{-1}$.

* * * * *